Aug. 25, 1925.

E. G. GARTIN 1,551,096

CHUCK MECHANISM

Filed June 7, 1920

Inventor:
Elmer G. Gartin.
by
Atty.

Patented Aug. 25, 1925.

UNITED STATES PATENT OFFICE.

ELMER G. GARTIN, OF CLAREMONT, NEW HAMPSHIRE, ASSIGNOR TO SULLIVAN MACHINERY COMPANY, A CORPORATION OF MASSACHUSETTS.

CHUCK MECHANISM.

Application filed June 7, 1920. Serial No. 387,239.

*To all whom it may concern:*

Be it known that I, ELMER G. GARTIN, a citizen of the United States, residing at Claremont, in the county of Sullivan and State of New Hampshire, have invented certain new and useful Improvements in Chuck Mechanisms, of which the following is a full, clear, and exact specification.

My invention relates to chuck mechanisms and more particularly to chuck mechanisms for rock drilling devices.

An object of my invention is to provide an improved chuck mechanism. A further object of my invention is to provide an improved chuck mechanism for rock drilling devices in which escape for grit is provided at a point in advance of any bearing surface. A still further object of my invention is to provide an improved chuck mechanism for rock drilling devices in which means are provided for preventing to a maximum degree the splashing of water upon the runner. Further objects of my invention will be apparent in the course of the following specification and claims.

In the accompanying drawings, I have shown for purposes of illustration, one form which my invention may assume in practice.

In these drawings—

Figure 1:
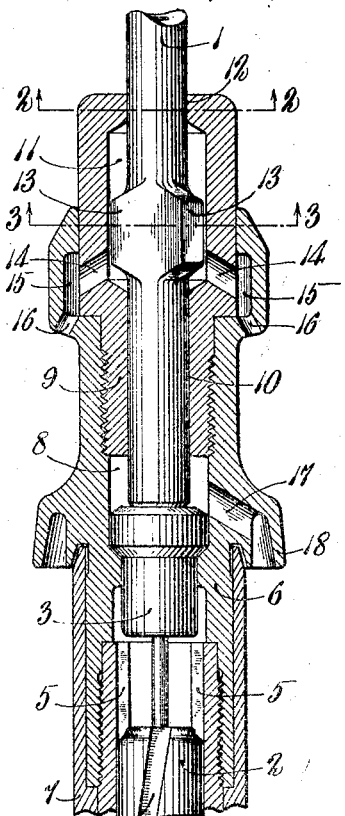
Fig. 1 is a central longitudinal section through the chuck mechanism and the forward end of the chuck housing of a percussive motor.
Figure 2:
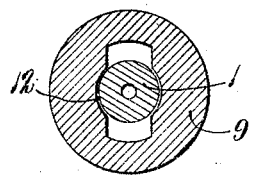
Fig. 2 is a transverse section taken on the line 2—2 of Fig. 1.
Figure 3:
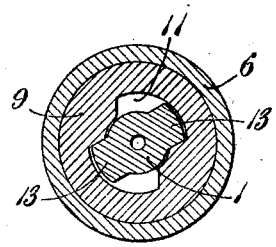
Fig. 3 is a transverse section on the line 3—3 of Fig. 1.

I have shown, by way of an illustrative embodiment of my invention, a chuck mechanism suitable for use in combination with a drill steel of well known type. In a tool of the type shown, a drill steel 1 is subjected to the percussive action of a piston 2 through the intermediation of a striking block 3, the piston by means of spiral grooves 4 and spiral splines (not shown as they are of well known construction) and straight grooves cooperating with straight splines 5 causing rotation of the chuck member 6 with respect to the front end of the chuck housing 7 in which the member 6 has its bearing.

The chuck member is provided with a chamber 8 within which the striking block is reciprocable and the forward end of this chamber is, in the present case, closed by a chuck proper 9, which is screwed, on account of the direction of rotation of the steel, with a left hand thread into the member 6. The chuck 9 is provided throughout its length with a bore 10 which is enlarged adjacent the forward end of the chuck into a space 11, which is somewhat similar in cross section to the shape that would be generated by the oscillation about the axis of the chuck of a figure formed by a pair of equal chords parallel to and at an equal distance from, but on opposite sides of a diameter of a circle and having the ends of the chords connected by oppositely angularly arranged lines. The extreme forward end of the chuck is provided with an opening 12 so shaped as to permit the passage therethrough of the lugs 13 formed on the drill steel 1, this opening being so located with respect to the chamber 11 that rotation of the chuck member may cause locking of the steel 1 within the chuck member. For the purpose of allowing the escape of cuttings which may be entrained by water running down the steel 1 during the drilling of overhead holes and to allow the water to escape, I have provided vents 14 extending in a generally radial direction from the bore 11 and opening into an annular groove 15 formed within the forward end of the member 6, and the annular groove 15 is provided with vents 16 directed in a generally rearward direction, these vents being so directed with respect to the tool that fluid thrown out of the chuck is directed in a rearward, i. e., downward direction by its passage through the vents 16. By reason of the rearward direction of the escaping liquid and abrasive material, spattering of the workman is reduced to a minimum. For the further purpose of permitting such liquid as may leak past the chamber 11 to escape from the chuck mechanism and thereby prevent its entering the cylinder of the drill, an additional vent 17 is provided opening into a rearwardly directed collar member 18. This last device, however, is illustrated and more fully described in the co-pending application of G. H. Gilman, Serial No. 306,014, filed June 23, 1919.

From the foregoing description, it will be evident that I have provided a chuck mechanism in which splashing of the tool runner will be reduced to a minimum and in which adequate provision is made for the escape of fluid and grit which may be carried by the fluid from the mechanism prior to a point where there would be danger of its entering the working cylinder of the tool, or any of the bearings of the rotation mechanism.

While I have in this application specifically described a certain form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. A chuck mechanism for drilling devices comprising a rotating chuck receiving member and an interchangeable steel holding and locking member secured thereto, said latter member comprising a single element.

2. A chuck mechanism for rock drilling devices comprising a chuck receiving member and a chuck member secured thereto and having means for permitting the escape of a return flow of liquid including cooperating escape vents formed in both of said members.

3. A chuck member for rock drilling devices comprising a chuck receiving member and a chuck member secured thereto, said chuck member being provided with means for locking a drill steel therein and having leakage vents formed therein for the escape of backward flowing fluid.

4. A chuck mechanism for rock drilling devices comprising a chuck receiving member, a chuck secured thereto, vents for escape of leakage from said chuck receiving member, an annular chamber cooperating with some of said vents, and vents in said chuck member communicating with said annular chamber.

5. A chuck mechanism for rock drilling devices comprising lugged steel receiving means provided with locking means to co-operate with the lugs thereon, a member co-operating with said receiving means, and a plurality of cooperating vents in said member and receiving means.

6. A chuck mechanism for rock drilling devices comprising tool receiving means and a plurality of longitudinally spaced vents therefrom, the most rearward of said vents being adapted to discharge the remainder of a backward flow of fluid not discharged by the forward vents.

7. A chuck mechanism for rock drilling devices comprising tool receiving means and a plurality of longitudinally spaced and rearwardly directed vents therefrom, the most rearward of said vents being adapted to discharge the remainder of a backward flow of fluid not discharged by the forward vents.

8. A chuck mechanism for rock drilling devices comprising a chuck receiving member and a chuck member, and longitudinally spaced vents in one of said members having rearwardly inclined orifices.

9. A chuck mechanism for rock drilling devices comprising a chuck receiving member and a chuck member, and means to permit the escape of rearwardly flowing fluid from said mechanism comprising longitudinally spaced vents in one of said members and vents cooperating with some of said first mentioned vents in the other of said members.

10. A chuck mechanism for rock drilling devices comprising a chuck receiving member and a chuck member, said chuck member being provided with a chamber to receive the lugs on a drill steel, and said chuck receiving member being provided with a chamber in which a striking plug is mounted, and means for permitting the outflow of fluid entering said chuck including passages connecting said lug receiving chamber and said striking plug chamber with the exterior of said chuck.

11. A chuck mechanism for a drilling device comprising a chuck receiving member having an annular recess, passages leading from said recess to the outside, a chuck member mounted in and fixed relative to said other member provided with the usual tool receiving opening, and passageways in said chuck connecting said opening with said recess.

12. A chuck mechanism for a drilling device comprising a chuck receiving member having an annular recess, passages leading rearwardly from said recess to the outside, a chuck member mounted in and fixed relative to said other member provided with the usual tool receiving opening, and passageways in said chuck connecting said opening with said recess.

13. A chuck mechanism for a drilling device comprising tool retaining means having means for allowing escape of a backward flow of fluid, said means including a plurality of longitudinally spaced passageways each having portions relatively angularly disposed to each other.

In testimony whereof I affix my signature.

ELMER G. GARTIN.